US010929538B2

(12) United States Patent
Jiang

(10) Patent No.: US 10,929,538 B2
(45) Date of Patent: Feb. 23, 2021

(54) NETWORK SECURITY PROTECTION METHOD AND APPARATUS

(71) Applicant: Huawei Technologies Co., Ltd., Shenzhen (CN)

(72) Inventor: Wu Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 15/631,337

(22) Filed: Jun. 23, 2017

(65) Prior Publication Data

US 2017/0302689 A1 Oct. 19, 2017

Related U.S. Application Data

(63) Continuation of application No. PCT/CN2016/072782, filed on Jan. 29, 2016.

(30) Foreign Application Priority Data

Feb. 15, 2015 (CN) .......................... 201510083707.8

(51) Int. Cl.
*G06F 21/56* (2013.01)
*H04L 29/06* (2006.01)
(Continued)

(52) U.S. Cl.
CPC .......... *G06F 21/568* (2013.01); *G06F 21/564* (2013.01); *G06F 21/57* (2013.01);
(Continued)

(58) Field of Classification Search
CPC ............... G06F 21/55–568; H04L 63/14–1491
See application file for complete search history.

(56) References Cited

U.S. PATENT DOCUMENTS

| 8,621,233 B1 | 12/2013 | Manadhata et al. |
| 9,038,186 B1 | 5/2015 | Manadhata et al. |

(Continued)

FOREIGN PATENT DOCUMENTS

| CN | 101483658 A | 7/2009 |
| CN | 102594780 A | 7/2012 |

(Continued)

OTHER PUBLICATIONS

Foreign Communication From a Counterpart Application, European Application No. 16748635.6, Extended European Search Report dated Aug. 30, 2017, 7 pages.

(Continued)

*Primary Examiner* — Matthew T Henning
(74) *Attorney, Agent, or Firm* — Conley Rose, P.C.

(57) ABSTRACT

A network security protection method is executed by a network security protection device and includes obtaining at least one of network environment data or threat detection data of a host that is in a protected network and that is connected to the network security protection device, where the network environment data includes an identifier of an operating system, a parameter of the operating system, an identifier of software with a network port access function, or a parameter of the software; and the threat detection data includes a threat type or a threat identifier, where the threat type includes a vulnerability or a malicious program; searching, according to the obtained at least one of network environment data or threat detection data, for corresponding information used to eliminate a security threat in the host; and sending the found information to the host.

17 Claims, 10 Drawing Sheets

| Correspondence number | Network environment data ||||| Cleanup program || File operation instruction || Operator |
|---|---|---|---|---|---|---|---|---|---|---|
| | Type of an operating system | Version of an operating system | Identifier of software | Version of software | ... | Identifier of a cleanup program | Location of a cleanup program | File name | File location | |
| R1 | Windows | Windows XP | QQ | QQ4 QQ5 | | Win11 | /patch/win-2013-0098.msi | Crazy.bat | %\System32\Drivers\ | Del |
| R2 | Windows | Windows XP Window 7 | | | | Win12 | /patch/win-1999-0016.msi | iessetup.exe | %\System32\Drivers\ | Del |
| R3 | | | | | | Win13 | /script/script-clean-3221.msi | movie.exe | %\System32\Drivers\ | Del |
| | | | | | | Linux13 | /script/script-clean-3221.bin | tr.exe | %\System32\Drivers\ | Del |
| R4 | Windows | Windows XP | | | | Win14 | /patch/win-2013-0098.msi | Shade.bat | %\System32\Drivers\ | Del |
| ... | ... | ... | ... | ... | ... | ... | ... | ... | ... | ... |

(51) Int. Cl.
*G06F 21/57* (2013.01)
*H04W 12/12* (2021.01)

(52) U.S. Cl.
CPC ............ *G06F 21/577* (2013.01); *H04L 29/06* (2013.01); *H04L 63/1408* (2013.01); *H04L 63/1416* (2013.01); *H04L 63/1433* (2013.01); *H04L 63/1441* (2013.01); *H04W 12/1206* (2019.01); *G06F 21/562* (2013.01); *H04L 63/02* (2013.01)

(56) References Cited

U.S. PATENT DOCUMENTS

| | | | |
|---|---|---|---|
| 9,667,648 B2* | 5/2017 | Teddy | H04L 63/1416 |
| 2003/0204632 A1* | 10/2003 | Willebeek-LeMair | H04L 29/06 709/249 |
| 2005/0216957 A1* | 9/2005 | Banzhof | H04L 63/02 726/25 |
| 2006/0101517 A1* | 5/2006 | Banzhof | G06F 21/577 726/25 |
| 2007/0250595 A1 | 10/2007 | Landfield | |
| 2011/0138469 A1 | 6/2011 | Ye et al. | |
| 2012/0084851 A1* | 4/2012 | Neystadt | G06F 21/335 726/9 |
| 2013/0276124 A1 | 10/2013 | Tahir et al. | |
| 2014/0109223 A1* | 4/2014 | Jin | H04W 12/1208 726/23 |
| 2014/0143538 A1 | 5/2014 | Lindteigen | |
| 2014/0245376 A1 | 8/2014 | Hibbert et al. | |
| 2014/0289853 A1* | 9/2014 | Teddy | G06F 21/566 726/23 |
| 2015/0040231 A1 | 2/2015 | Oliphant et al. | |
| 2017/0316206 A1 | 11/2017 | Zou et al. | |

FOREIGN PATENT DOCUMENTS

| | | |
|---|---|---|
| CN | 103944915 A | 7/2014 |
| CN | 104573515 A | 4/2015 |

OTHER PUBLICATIONS

Machine Translation and Abstract of Chinese Publication No. CN103944915, Apr. 29, 2015, 27 pages.
Foreign Communication From a Counterpart Application, Chinese Application No. 201510083707.8, Chinese Office Action dated Mar. 21, 2019, 7 pages.
Foreign Communication From a Counterpart Application, Chinese Application No. 16748635.6, Chinese Office Action dated Apr. 12, 2019, 5 pages.
Machine Translation and Abstract of Chinese Publication No. CN102594780, Jul. 18, 2012, 5 pages.
Foreign Communication From a Counterpart Application, PCT Application No. PCT/CN2016/072782, English Translation of International Search Report dated May 5, 2016, 2 pages.

\* cited by examiner

| Correspondence number | Network environment data | | | | | Cleanup program | | File operation instruction | | |
|---|---|---|---|---|---|---|---|---|---|---|
| | Type of an operating system | Version of an operating system | Identifier of software | Version of software | ... | Identifier of a cleanup program | Location of a cleanup program | File name | File location | Operator |
| R1 | Windows | Windows XP | QQ | QQ4 QQ5 | | Win11 | /patch/win-2013-0098.msi | Crazy.bat | %\System32\Drivers\ | Del |
| R2 | Windows | Windows XP Window 7 | | | | Win12 | /patch/win-1999-0016.msi | iessetup.exe | %\System32\Drivers\ | Del |
| R3 | | | | | | Win13 | /script/script-clean-3221.msi | movie.exe | %\System32\Drivers\ | Del |
| | | | | | | Linux13 | /script/script-clean-3221.bin | tr.exe | %\System32\Drivers\ | Del |
| R4 | Windows | Windows XP | | | | Win14 | /patch/win-2013-0098.msi | Shade.bat | %\System32\Drivers\ | Del |
| ... | | | | | ... | | ... | ... | ... | ... |

FIG. 4

| Correspondence number | Threat detection data | | Cleanup policy | | ... | File operation instruction | | |
|---|---|---|---|---|---|---|---|---|
| | Threat type | Threat identifier | Identifier of a cleanup program | Location of a cleanup program | | File name | File location | Operator |
| R11 | | | Win11 | /patch/win-2013-0098.msi | | Crazy.bat | %\System32\Drivers\ | Del |
| R12 | Vulnerability | CVE-1999-0016 | Win12 | /patch/win-1999-0016.msi | | iessetup.exe | %\System32\Drivers\ | Del |
| R13 | Trojan | script-3221 | Win13 | /script/script-clean-3221.msi | | movie.exe | %\System32\Drivers\ | Del |
| | | | Linux13 | /script/script-clean-3221.bin | | tr.exe | %\System32\Drivers\ | Del |
| R14 | Vulnerability | CVE-2013-0098 | Win14 | /patch/win-2013-0098.msi | | Shade.bat | %\System32\Drivers\ | Del |
| ... | ... | | | ... | | ... | ... | ... |

FIG. 5

| | Operator | Del | Del | ⋮ |
|---|---|---|---|---|
| File operation instruction | File location | %\System32\Drivers\ | %\System32\Drivers\ | ⋮ |
| | File name | Crazy.bat | iessetup.exe | ⋮ |
| Cleanup policy | File operator | Delete | Delete | ⋮ |
| | File path | $//Program File/Magic Printer/ | $//Program File/Botnet/ | ⋮ |
| | File identifier | Pds.exe | killram.exe | ⋮ |
| Threat detection data | Threat identifier | | Bot-4162 | ⋮ |
| | Threat type | | Worm | ⋮ |
| Network environment data | Version of software | Reader5.0 | | ⋮ |
| | Identifier of software | Reader | | ⋮ |
| | Version of an operating system | Windows7 | | ⋮ |
| | Type of an operating system | Windows | | ⋮ |
| Correspondence number | | R31 | R32 | ⋮ |

FIG. 6

NETWORK SECURITY PROTECTION METHOD AND APPARATUS

CROSS-REFERENCE TO RELATED APPLICATIONS

This application is a continuation of International Application No. PCT/CN2016/072782, filed on Jan. 29, 2016, which claims priority to Chinese Patent Application No. 201510083707.8, filed on Feb. 15, 2015. The disclosures of the aforementioned applications are hereby incorporated by reference in their entireties.

TECHNICAL FIELD

The present disclosure relates to the field of computer network technologies, and in particular, to a network security protection method and a network security protection apparatus.

BACKGROUND

With the rapid development of information technologies, how to protect security of network resources within a specific range, for example, protect confidential data stored in a file server and a database server from being maliciously thieved, protect services provided by a web server and a mail server from breakdown due to an attack, and protect communication between users within an enterprise network from being unlawfully eavesdropped, becomes a widely concerned issue.

A basic implementation principle of an existing network security protection solution is as follows. A protected server and a terminal form a protected network, and the protected network accesses the Internet using a security gateway. The security gateway refers to a gateway device integrated with security functions, such as a firewall, an intrusion prevention system (IPS), and deep packet inspection (DPI).

A network is divided into different security domains according to different security requirements of various devices. By configuring an inter-domain policy between different security domains, security processing is performed on network traffic flowing through the security gateway. For example, devices such as a file server, a web server, a mail server, and a database server that are in the protected network and have the highest requirement on security are compartmentalized into a first network address segment, and the first network address segment is set to be corresponding to a high-level security domain. Terminals used by employees in a core department handling confidential information in an enterprise are compartmentalized into a second network address segment, and the second network address segment is set to be corresponding to a medium-level security domain. Terminals used by common employees in the enterprise are compartmentalized into a third network address segment, and the third network address segment and a network address range of a node that is in the Internet and to which the security gateway is connected are corresponding to a low-level security domain. It is preset that DPI processing needs to be performed on traffic from the low-level security domain to the high-level security domain. In this way, when receiving a packet sent to the file server by a common employee in the enterprise, the security gateway performs, by matching with an inter-domain policy, DPI processing on the packet sent to the file server by the common employee. If it is determined, in a process of performing the DPI processing, that the packet sent by the common employee to the file server matches a feature of a known malicious program, the packet is discarded; if the packet sent by the common user to the file server does not match a feature of a known malicious program, the packet is forwarded to the file server.

However, in the foregoing solution, the security gateway can find only a threat that has occurred, but can neither find a potential threat before the threat occurs, nor eliminate a threat after the threat occurs. For example, after a Trojan program is planted into a terminal used by a common employee in an enterprise, the terminal sends a large quantity of attack packets to the file server or another server. In the prior art, the attack packets can be found and blocked only after the terminal used by the common employee sends the large quantity of attack packets.

SUMMARY

Embodiments of the present disclosure provide a network security protection method, to improve efficiency of an existing network security protection technology.

Technical solutions provided in the embodiments of the present disclosure are as follows.

According to a first aspect, a network security protection method is provided and is executed by a network security protection device, and the method includes obtaining at least one of network environment data or threat detection data of a host that is in a protected network and that is connected to the network security protection device, where the network environment data includes at least one of the following: an identifier of an operating system, a parameter of the operating system, an identifier of software with a network port access function, or a parameter of the software; and the threat detection data includes at least one of the following: a threat type or a threat identifier, where the threat type includes at least one of a vulnerability or a malicious program; searching, according to the obtained at least one of network environment data or threat detection data, for corresponding information used to eliminate a security threat in the host; and sending the information used to eliminate the security threat in the host to the host.

In a first possible implementation manner of the first aspect, the information used to eliminate the security threat in the host includes an identifier and a storage location of a cleanup program, and the identifier and the storage location of the cleanup program are used to eliminate the security threat in the host.

In a second possible implementation manner of the first aspect, the information used to eliminate the security threat in the host includes a cleanup program used to eliminate the security threat in the host; and the searching for corresponding information used to eliminate a security threat in the host includes searching for an identifier and a storage location of a corresponding cleanup program, and obtaining, according to the identifier and the storage location, the cleanup program used to eliminate the security threat in the host.

In a third possible implementation manner of the first aspect, the information used to eliminate the security threat in the host includes a file operation instruction, where the file operation instruction includes a file identifier, a file storage location, and an operator, and the file operation instruction is used to instruct the host to perform an operation represented by the operator on a file that is in the host and that is determined according to the file identifier and the file storage location.

According to a second aspect, a network security protection apparatus is provided, including a receiving unit configured to obtain at least one of network environment data or threat detection data of a host that is in a protected network and that is connected to the network security protection apparatus, where the network environment data includes at least one of the following: an identifier of an operating system, a parameter of the operating system, an identifier of software with a network port access function, or a parameter of the software; and the threat detection data includes at least one of the following: a threat type or a threat identifier, where the threat type includes at least one of a vulnerability or a malicious program; a processing unit configured to search, according to the at least one of network environment data or threat detection data obtained by the receiving unit, for corresponding information used to eliminate a security threat in the host; and a sending unit configured to provide the host with the information that is used to eliminate the security threat in the host and that is found by the processing unit.

In a first possible implementation manner of the second aspect, the information used to eliminate the security threat in the host includes an identifier and a storage location of a cleanup program, and the identifier and the storage location of the cleanup program are used to eliminate the security threat in the host.

In a second possible implementation manner of the second aspect, the information used to eliminate the security threat in the host includes a cleanup program used to eliminate the security threat in the host; and the processing unit is configured to search for an identifier and a storage location of a corresponding cleanup program, and obtain, according to the identifier and the storage location, the cleanup program used to eliminate the security threat in the host.

In a third possible implementation manner of the second aspect, the information used to eliminate the security threat in the host includes a file operation instruction, where the file operation instruction includes a file identifier, a file storage location, and an operator, and the file operation instruction is used to instruct the host to perform an operation represented by the operator on a file that is in the host and that is determined according to the file identifier and the file storage location.

According to a third aspect, a network security protection device is provided, including a processor, a memory, and a network interface, where the processor, the memory, and the network interface communicate with each other using a bus; the memory is configured to store program code and data; the network interface is configured to obtain at least one of network environment data or threat detection data of a host that is in a protected network and that is connected to the network security protection device, where the network environment data includes at least one of the following: an identifier of an operating system, a parameter of the operating system, an identifier of software with a network port access function, or a parameter of the software; and the threat detection data includes at least one of the following: a threat type or a threat identifier, where the threat type includes at least one of a vulnerability or a malicious program; and the processor is configured to read the program code and the data that are stored in the memory, to perform the following operations: searching, according to the at least one of network environment data or threat detection data obtained using the network interface, for corresponding information used to eliminate a security threat in the host; and providing, using the network interface, the host with the information used to eliminate the security threat in the host.

In a first possible implementation manner of the third aspect, the information used to eliminate the security threat in the host includes an identifier and a storage location of a cleanup program, and the identifier and the storage location of the cleanup program are used to eliminate the security threat in the host.

In a second possible implementation manner of the third aspect, the information used to eliminate the security threat in the host includes a cleanup program used to eliminate the security threat in the host; and the processor is configured to search for an identifier and a storage location of a corresponding cleanup program, and obtain, according to the identifier and the storage location, the cleanup program used to eliminate the security threat in the host.

In a third possible implementation manner of the third aspect, the information used to eliminate the security threat in the host includes a file operation instruction, where the file operation instruction includes a file identifier, a file storage location, and an operator, and the file operation instruction is used to instruct the host to perform an operation represented by the operator on a file that is in the host and that is determined according to the file identifier and the file storage location.

In the embodiments of the present disclosure, a network security protection device obtains at least one of network environment data or threat detection data of a host that is in a protected network and that is connected to the network security protection device; searches, according to the obtained at least one of network environment data or threat detection data, for corresponding information used to eliminate a security threat in the host, such as a cleanup program; and provides the host with the information used to eliminate the security threat in the host. Therefore, the network security protection device can not only find a threat that has occurred in the protected network, but also find a potential threat, and actively trigger the host to eliminate the security threat, thereby improving a network security protection effect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

FIG. 4 is a schematic diagram of a record set according to an embodiment of the present disclosure;

FIG. 5 is a schematic diagram of another record set according to an embodiment of the present disclosure;

FIG. 6 is a schematic diagram of still another record set according to an embodiment of the present disclosure;

DESCRIPTION OF EMBODIMENTS

Figure 1A:
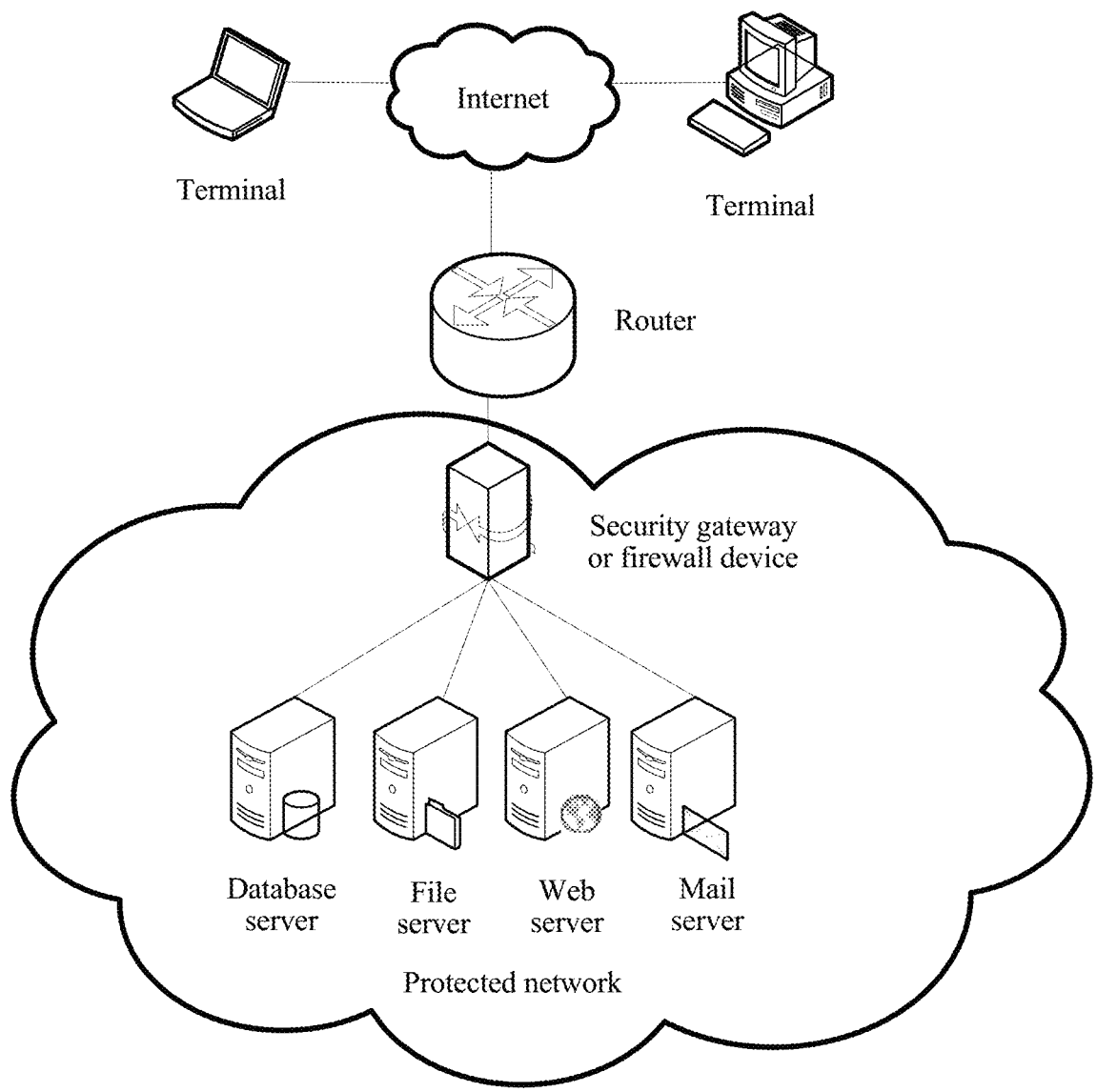
FIG. 1A is a schematic diagram of a first application scenario of a network security protection solution according to an embodiment of the present disclosure.
Figure 1B:
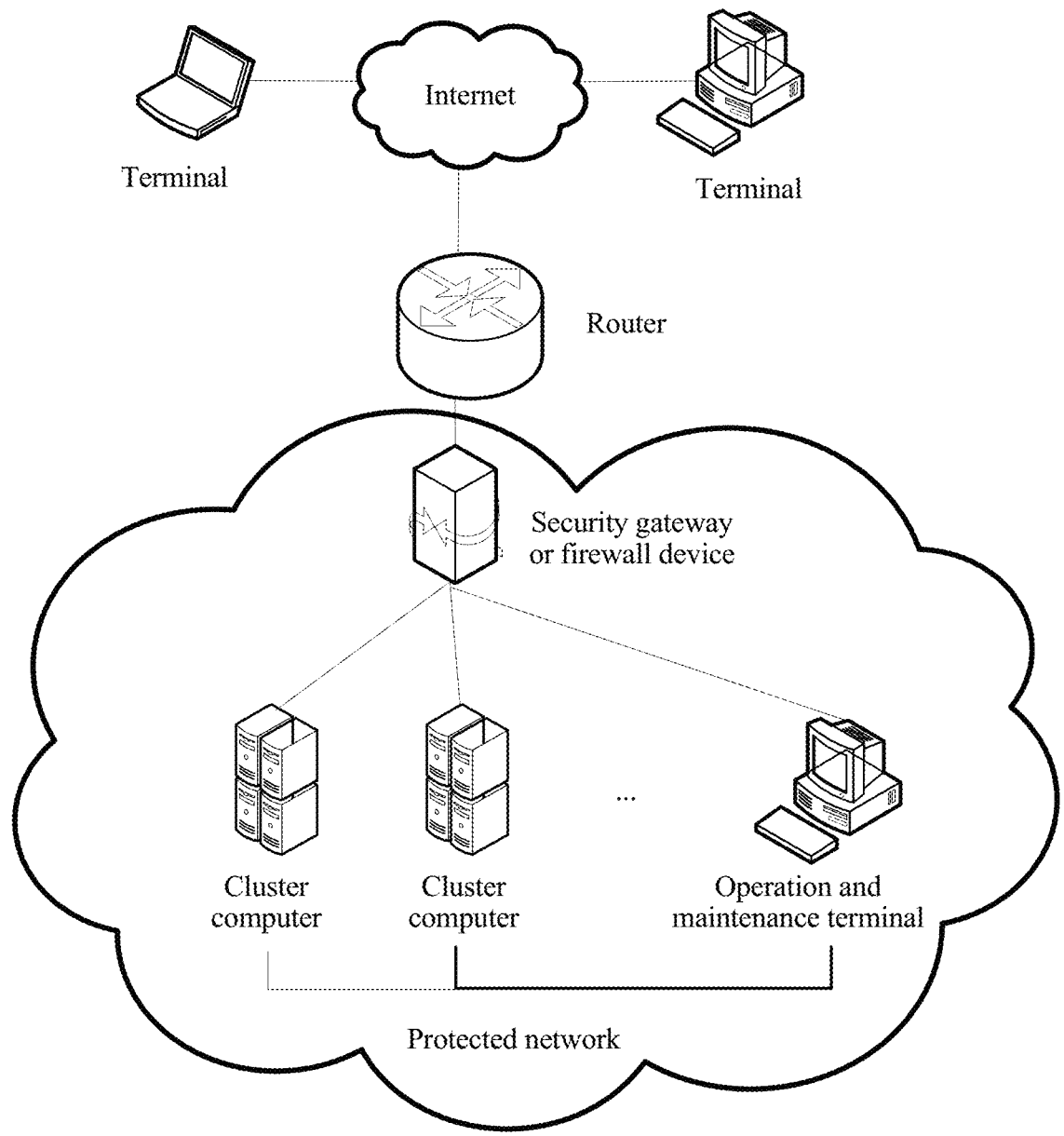
FIG. 1B is a schematic diagram of a second application scenario of a network security protection solution according to an embodiment of the present disclosure.
Figure 1C:
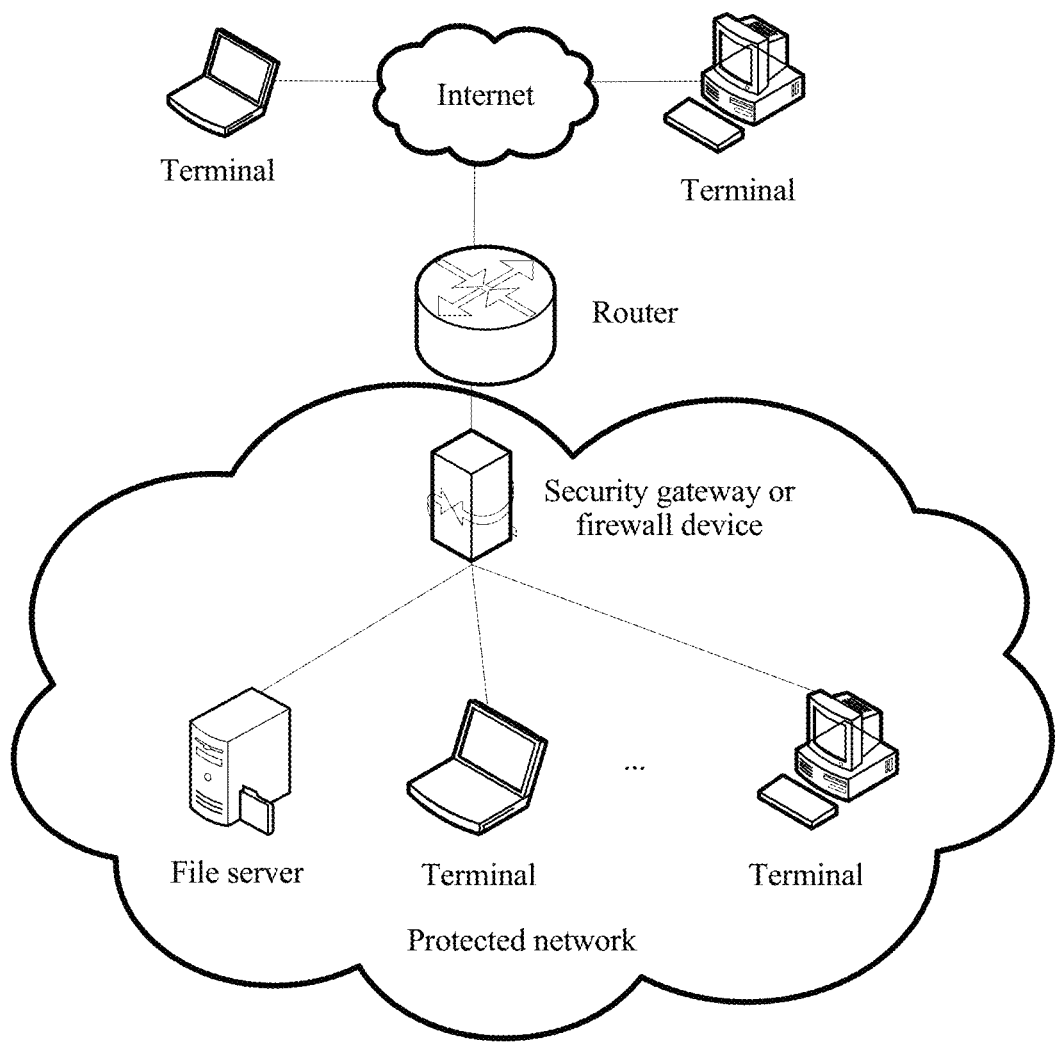
FIG. 1C is a schematic diagram of a third application scenario of a network security protection solution according to an embodiment of the present disclosure.

A network security protection solution provided in an embodiment of the present disclosure may be applied to multiple scenarios, for example, an Internet data center (IDC) scenario shown in FIG. 1A, a cloud computing scenario shown in FIG. 1B, and an enterprise network scenario shown in FIG. 1C.

In the IDC scenario shown in FIG. 1A, a protected network includes various hosted application servers, such as a file server, a web server, a mail server, and a database server. The protected network accesses the Internet using a gateway, and a remote maintenance engineer or a tenant on the Internet may remotely access the foregoing various application servers.

In the cloud computing scenario shown in FIG. 1B, a protected network includes multiple virtual machines, and these virtual machines are implemented, using a virtualization technology, based on a computing resource provided by a cluster computer in the protected network and a storage resource provided by a storage device in the protected network. The protected network accesses the Internet using a gateway, and a virtual machine user on the Internet remotely connects to the foregoing virtual machines using client software.

In the enterprise network scenario shown in FIG. 1C, a protected network is an enterprise network, and the protected network accesses the Internet using a gateway. Using instant messaging software, a user on the Internet may communicate with a user on the enterprise network, or request a service provided by an application server in the enterprise network.

An embodiment of the present disclosure provides a network security protection device, and the network security protection device is located in a protected network and is used to protect information security of the protected network. The network security protection device may be integrated into a gateway, a firewall, or a network address translation (NAT) device that is shown in FIG. 1A to FIG. 1C and that is used to connect the protected network to the Internet, or may be an independent device deployed at another location in the protected network provided that the network security protection device can communicate with a device in the protected network, such as various application servers, virtual machines, and terminal devices that include a personal computer of a common user.

For ease of description, the various application servers, virtual machines, and terminal devices are collectively referred to as a host in the embodiments of the present disclosure.

Figure 2:
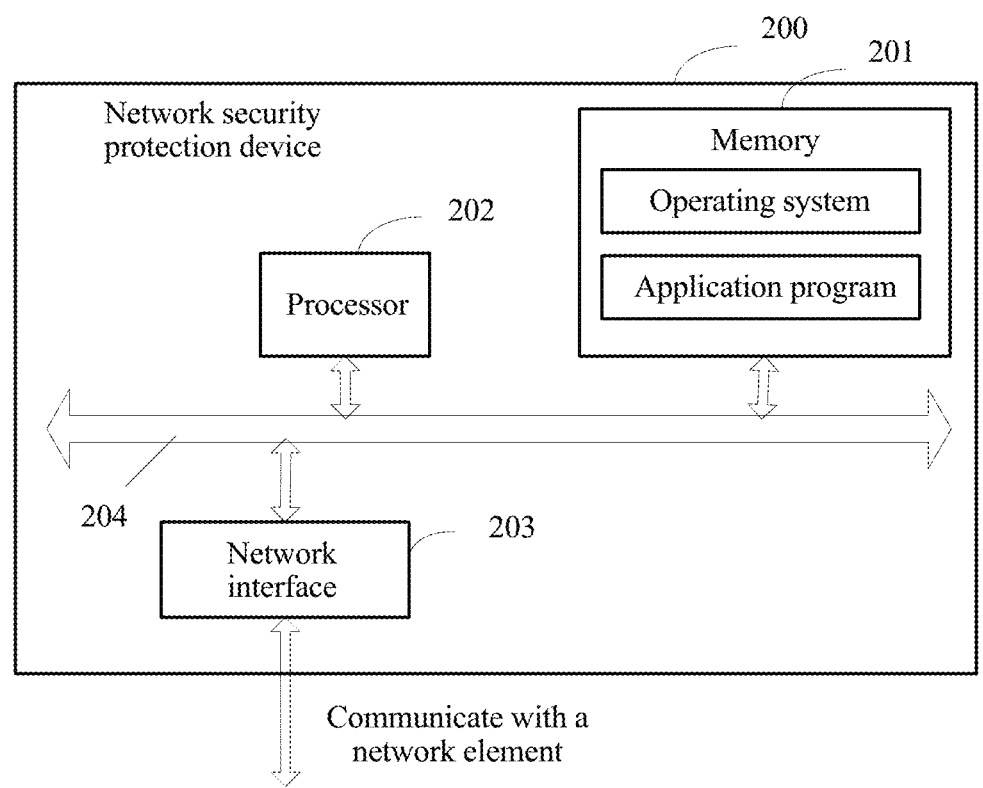
FIG. 2 is a schematic structural diagram of a network security protection device according to an embodiment of the present disclosure.

FIG. 2 is a schematic structural diagram of a network security protection device 200 according to an embodiment of the present disclosure. The network security protection device 200 includes a memory 201, a processor 202, a network interface 203, and a bus 204, where the memory 201, the processor 202, and the network interface 203 communicate with each other using the bus 204.

The memory 201 includes but is not limited to a random access memory (RAM), a read-only memory (ROM), an erasable programmable read only memory (EPROM or a flash memory), or a compact disc read-only memory (CD-ROM).

The processor 202 may be one or more central processing units (CPU). If the processor 202 is one CPU, the CPU may be a single-core CPU, or may be a multi-core CPU.

The network interface 203 may be a network interface, or may be multiple network interfaces. The network interface 203 may be a wired interface, such as a fiber distributed data interface (FDDI), or a Gigabit Ethernet (GE) interface; or the network interface 203 may be a wireless interface.

The memory 201 is configured to store program code and data.

The network interface 203 is configured to receive at least one of network environment data or threat detection data of a host that is in a protected network and that is connected to the network security protection device 200. Two types of data are involved in this embodiment.

A first type of data is the network environment data, which refers to some information used to describe a network environment in which the host is located. The information is not directly related to a threat or a potential risk, and does not reflect whether malicious code is planted into the host. The network environment data includes but is not limited to one of the following or a combination of more of the following: an identifier of an operating system, a parameter of the operating system, an identifier of software with a network port access function, or a parameter of the software. The identifier of the operating system may be a name of the operating system, such as WINDOWS or LINUX. The parameter of the operating system includes a version of the operating system, such as WINDOWS XP, WINDOWS 7, or WINDOWS VISTA 8.

The software with a network port access function refers to software that can send a packet to another network device using a network interface of the host, or perform a specified function according to data carried in a packet received using the network interface, for example, a web browser INTERNET EXPLORER (IE), or instant messaging software QQ launched by Tencent. A parameter of the foregoing software includes a software version, such as QQ 5.0, QQ 5.1, or QQ 6.0.

A second type of data is the threat detection data, which refers to data that can reflect a potential risk or a threat existing in the host, and includes but is not limited to at least one of a threat type, a threat identifier, or the like. The threat type includes at least one of a vulnerability or a malicious program, and the malicious program includes a zombie program, a Trojan program, a worm program, and the like. If the threat type is a malicious program, the threat identifier is a name of the malicious program. If the threat type is a vulnerability, the threat identifier is a vulnerability number. For example, the vulnerability number may be a Common Vulnerabilities and Exposures (CVE) number used by a world-famous vulnerability knowledge base, a computer security mailing list BUGTRAQ number, or a China CVE (CNCVE_number or a China National Vulnerability Database of Information Security (CNNVD) number used in China.

The processor 202 is configured to read the program code and the data that are stored in the memory 201 to perform the following operations: searching, according to the at least one of network environment data or threat detection data obtained using the network interface 203, for corresponding information used to eliminate a security threat in the host; and sending, using the network interface 203, the information used to eliminate the security threat in the host to the host.

Optionally, the memory 201 further stores a database, and the database stores a correspondence, shown in FIG. 4, between network environment data and information used to eliminate a security threat in the host; or a correspondence, shown in FIG. 5, between threat detection data and information used to eliminate a security threat in the host; or a correspondence, shown in FIG. 6, between information used to eliminate a security threat in the host and a combination of network environment data and threat detection data. Therefore, the processor 202 searches, according to the at least one of network environment data or threat detection data obtained by the network interface 203, for corresponding information used to eliminate a security threat in the host.

This embodiment provides three types of information used to eliminate a security threat in the host Eliminating the security threat in the host includes but is not limited to repairing a vulnerability, deleting a malicious program, deleting a file generated by a malicious program, recovering a file modified by a malicious program, or the like.

A first type of information used to eliminate the security threat in the host is an identifier and a storage location of a cleanup program. The network security protection device 200 sends the identifier and the storage location of the cleanup program to the host, so that the host obtains the cleanup program according to the received identifier and storage location of the cleanup program.

The identifier of the cleanup program may be a name of the cleanup program. The storage location of the cleanup program is a logical storage path, and the logical storage path may be a path in a file system of the network security protection device 200, such as "D:\remove app set\"; or may be a path in another storage device, such as a File Transfer Protocol (FTP) server, that can be accessed by the network security protection device 200, such as ftp://administrator:123 @ 192.168.4.189/remove app set, which is not limited herein.

A second type of information used to eliminate the security threat in the host is a cleanup program. In this case, the processor 202 first searches for, according to the at least one of network environment data or threat detection data obtained by the network interface 203, an identifier and a storage location of a corresponding cleanup program, and then obtains, according to the identifier and the storage location, the cleanup program used to eliminate the security threat in the host.

A third type of information used to eliminate the security threat in the host is a file operation instruction, where the file operation instruction includes a file identifier, a file storage location, and an operator, and the file operation instruction is used to instruct the host to perform an operation represented by the operator on a file that is in the host and that is determined according to the file identifier and the file storage location. An original intention of providing the file operation instruction is as follows. The cleanup program can automatically perform a series of operations after running in the host. For example, for a Trojan malicious program, the cleanup program can forcibly shut down a process generated when the malicious program runs, delete a newly added file generated when the malicious program runs, and recover from a modification on an operating system registry performed by the malicious program. This process does not involve participation of a host user, and is a fast, efficient, and thorough cleanup manner. However, because a relatively long development cycle is required to develop a particular cleanup program for network environment data, threat detection data, or a combination of network environment data and threat detection data of a typical host, how to reduce an effect of a security threat on the host as much as possible before a formal cleanup program is released becomes a problem that needs to be resolved. This embodiment of the present disclosure provides another optional solution in which, if there is no available particular cleanup program, some file operation instructions may be sent to the host, so that some simple functions, such as a file deletion function, that an operating system comes with may be used to reduce an effect of a security threat on the host.

This embodiment of the present disclosure provides a network security protection device. The network security protection device obtains at least one of network environment data or threat detection data of a host that is in a protected network and that is connected to the network security protection device; searches, according to the obtained at least one of network environment data or threat detection data, for corresponding information used to eliminate a security threat in the host, such as a cleanup program; and provides the host with the information used to eliminate the security threat in the host. Therefore, the network security protection device can not only find a threat that has occurred in the protected network, but also find a potential threat, and actively trigger the host to eliminate the security threat, thereby improving a network security protection effect.

With reference to accompanying drawings, the following expounds, from a perspective of a method procedure using specific examples, main implementation principles of the technical solutions in the embodiments of the present disclosure, specific implementation manners thereof, and beneficial effects that can be accordingly achieved using the technical solutions. The embodiments of the present disclosure are performed by the foregoing network security protection device.

Figure 3:
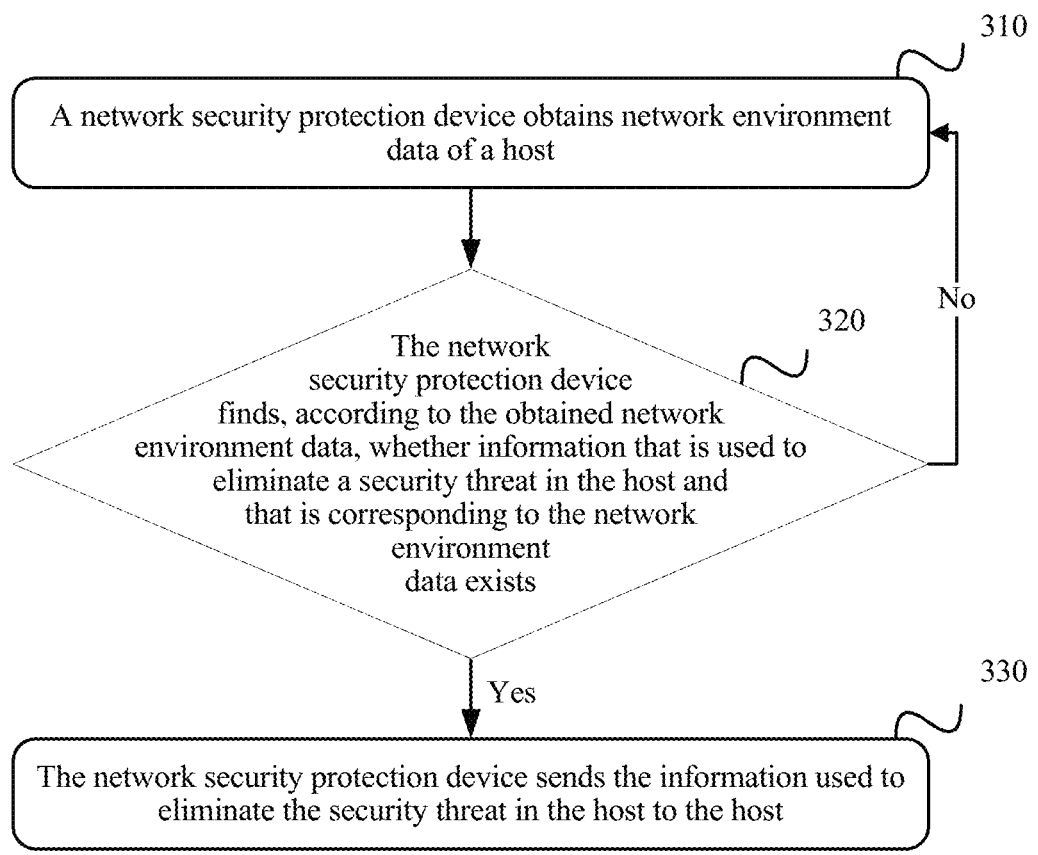
FIG. 3 is a flowchart of a network security protection method according to an embodiment of the present disclosure.

As shown in FIG. 3, an embodiment procedure of an embodiment of the present disclosure is as follows.

Step 310: A network security protection device obtains network environment data of a host.

The network security protection device obtains the network environment data of the host in an active manner or a passive manner. The active manner means that vulnerability scanning software, such as NESSUS or X-SCAN, is run, and the network environment data is obtained from a scan result obtained using the vulnerability scanning software. A scan result obtained using a vulnerability scanning software generally includes network environment data and threat detection data at the same time. The network security protection device may obtain the network environment data from the scan result according to a preset field identifier, for example, obtain an identifier of an operating system from an operating system identifier (OS ID) field, and then obtain a version of the operating system from an OS Version field. In addition, in scan results obtained using different vulnerability scanning software, field identifiers, arrangement sequences of fields, and data formats in fields may be different. For ease of subsequent comparison, the network security protection device should perform normalization or standardization preprocessing on the obtained network environment data or threat detection data.

The passive manner means that the network environment data is obtained by performing packet parsing on traffic flowing through the network security protection device.

For example, in this embodiment, the network security protection device learns that an identifier of an operating system, a version of the operating system, an identifier of software, and a version of the software that are in network environment data of a Host1 are respectively WINDOWS, WINDOWS XP, QQ, and QQ4.

Step 320: The network security protection device finds, according to the obtained network environment data, whether information that is used to eliminate a security threat in the host and that is corresponding to the network environment data exists; if the corresponding information used to eliminate the security threat in the host exists, perform step 330; if the corresponding information used to eliminate the security threat in the host does not exist, return to step 310.

FIG. 4 is a schematic diagram of a record set according to an embodiment of the present disclosure, and the record set includes multiple records among which R1 to R4 are used as examples. Each record includes at least a correspondence between network environment data and information used to eliminate a security threat in the host. The network security protection device compares the network environment data obtained in step 310 with the records R1 to R4 in FIG. 4. If network environment data included in a record is the same as the network environment data obtained in step 310, information that is used to eliminate the security threat in the host and that is included in the record is determined as the found information used to eliminate the security threat in the host.

In this example, the network security protection device determines that network environment data in R1 is the same as the network environment data obtained in step 310. Specific content recorded in R1 is shown in FIG. 4, and the recorded content indicates that, when an identifier of an operating system, a version of the operating system, an identifier of software, and a version of the software that are in the network environment data are respectively Windows, Windows XP, QQ, and QQ4 or QQ5, a name of a corresponding cleanup program is Win11, a storage location of the cleanup program is/patch/win-2013-0098.msi, and a file name, a file location, and an operator that are included in a corresponding file operation instruction are respectively Crazy.bat, %\System32\Drivers\, and Del, where the file operation instruction is used to instruct the host to delete a file whose name is Crazy.bat and that is in a path of %\System32\Drivers\.

Optionally, the network security protection device may obtain, according to a preset type of information sent to the host and the records in FIG. 4, the information used to eliminate the security threat in the host, where the type of information refers to a type of information used to eliminate the security threat in the host, for example, the foregoing first type of information "an identifier and a storage location of a cleanup program", or the foregoing second type of information "a cleanup program", or the foregoing third type of information "a file operation instruction". It may be preset that at least one type of information used to eliminate the security threat in the host is sent to the host. A rule used for sending the host the information used to eliminate the security threat in the host may be further set in the network security protection device. For example, if information about a cleanup program exists in FIG. 4, the first type of information and the second type of information are sent to the host; or if information about a cleanup program does not exist in FIG. 4, the third type of information is sent to the host.

For example, if it is preset that the first type of information is sent to the host, the network security protection device may directly obtain, from R1, a name Win11 of a cleanup program and a storage location/patch/win-2013-0098.msi of the cleanup program.

If it is preset that the second type of information is sent to the host, after obtaining, from R1, a name Win11 of a cleanup program and a storage location/patch/win-2013-0098.msi of the cleanup program, the network security protection device obtains the cleanup program whose name is Win11 at the storage location of/patch/win-2013-0098.msi.

If it is preset that the third type of information, that is, a file operation instruction, is sent to the host, the network security protection device may directly obtain the file operation instruction from R1, where a file name, a file location, and an operator that are included in the file operation instruction are respectively Crazy.bat, %\System32\Drivers\, and Del.

Step 330: The network security protection device sends the information used to eliminate the security threat in the host to the host.

If the information used to eliminate the security threat in the host is a name Win11 of a cleanup program and a storage location/patch/win-2013-0098.msi of the cleanup program, the network security protection device sends the name Win11 of the cleanup program and the storage location/patch/win-2013-0098.msi of the cleanup program to the host Host1, so that the host Host1 obtains, according to the storage location/patch/win-2013-0098.msi, the cleanup program whose name is Win11, and runs the cleanup program to eliminate the threat.

If the information used to eliminate the security threat in the host is a cleanup program whose name is Win11, the network security protection device sends the obtained cleanup program whose name is Win11 to the host Host1, so that the Host1 runs the cleanup program to eliminate the threat.

If the information used to eliminate the security threat in the host is a file operation instruction including a file name, a file location, and an operator that are respectively Crazy.bat, %\System32\Drivers\, and Del, the network security protection device sends the file operation instruction to the host Host1, so that the Host1 executes the file operation instruction to eliminate the threat.

In the network security protection method provided in this embodiment of the present disclosure, a network security protection device obtains network environment data of a host that is in a protected network and that is connected to the network security protection device, and searches, according to the obtained network environment data, for corresponding information used to eliminate a security threat in the host, such as a cleanup program. Afterward, the network security protection device sends the information used to eliminate the security threat in the host to the host. The host eliminates the threat according to the information used to eliminate the security threat in the host. Using the foregoing solution, the network security protection device can find a potential threat in the protected network, and actively trigger to eliminate the security threat, so as to achieve a preventive purpose, and improve a network security protection effect. Compared with the prior art in which only an attack packet sent by the host is discarded, the foregoing solution improves efficiency of security protection.

In FIG. 3, a security protection method provided in the present disclosure is described using an example in which a network security protection device obtains network environment data of a host. Alternatively, the network security protection device may also obtain threat detection data of the host; search, according to the threat detection data, for corresponding information used to eliminate a security threat in the host; and send the found information used to eliminate the security threat in the host to the host.

FIG. 5 is a schematic diagram of another record set according to an embodiment of the present disclosure, and the record set includes multiple records among which R11 to R14 are used as examples. Each record includes at least a correspondence between threat detection data and information used to eliminate a security threat in the host. The network security protection device compares the obtained threat detection data with the records R11 to R14 in FIG. 5, and if threat detection data included in a record is the same as the obtained threat detection data, information that is used to eliminate the security threat in the host and that is included in the record is determined as the found information used to eliminate the security threat in the host. A process of obtaining, by the network security protection device according to FIG. 5, the information used to eliminate the security threat in the host, and sending the obtained information used to eliminate the security threat in the host to the host is similar to the foregoing description of step 320, and details are not described herein again.

Alternatively, the network security protection device may search, according to a combination of network environment data and threat detection data, for corresponding information used to eliminate a security threat in the host, and send the found information used to eliminate the security threat in the host to the host.

FIG. 6 is a schematic diagram of another record set according to an embodiment of the present disclosure, and the record set includes multiple records among which R31 and R32 are used as examples. Each record includes at least a correspondence between information used to eliminate a security threat in the host and a combination of network environment data and threat detection data. The network security protection device compares the obtained combination of network environment data and threat detection data with the records R31 and R32 in FIG. 6, and if a combination that is of network environment data and threat detection data and that is included in a record is the same as the obtained combination of network environment data and threat detection data, information that is used to eliminate a security threat in the host and that is included in the record is determined as the found information used to eliminate the security threat in the host. A process of obtaining, by the network security protection device according to FIG. 6, the information used to eliminate the security threat in the host, and sending the obtained information used to eliminate the security threat in the host to the host is similar to the foregoing description of step 320, and details are not described herein again.

After obtaining the network environment data and the threat detection data, in order to find the information used to eliminate the security threat in the host as much as possible, a searching procedure may be improved. For example, FIG. 4 is first searched, according to the network environment data, for the information used to eliminate the security threat in the host; and then, FIG. 5 is searched, according to the threat detection data, for the information used to eliminate the security threat in the host, and next, FIG. 6 is searched, according to the network environment data and the threat detection data, for the information used to eliminate the security threat in the host. Alternatively, FIG. 4, FIG. 5 and FIG. 6 are simultaneously searched for the information used to eliminate the security threat in the host.

Figure 7:
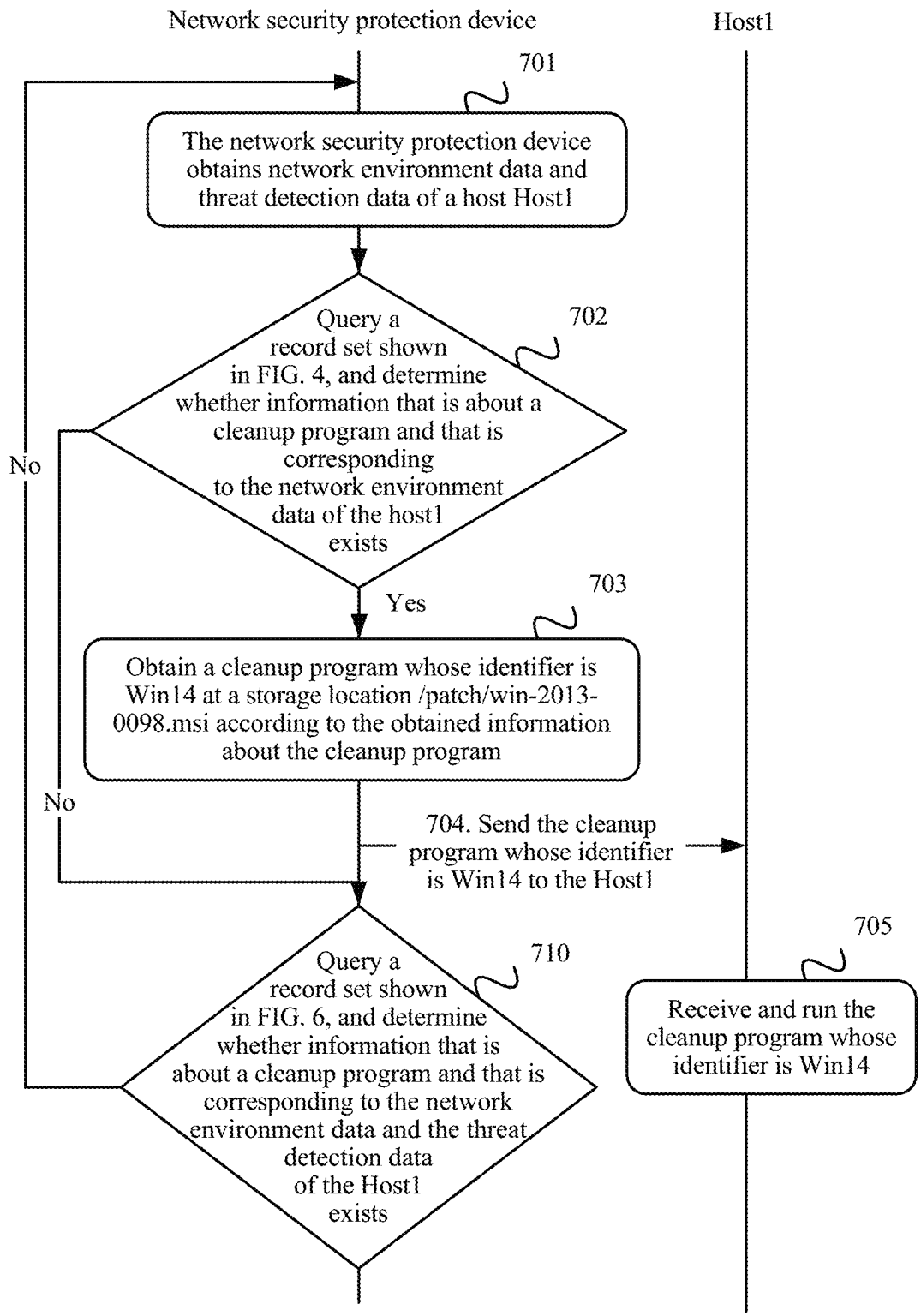
FIG. 7 is a schematic diagram of an example of a network security protection method according to an embodiment of the present disclosure.

With reference to a specific example, the following describes a network security protection device and a network security protection method that are provided in the embodiments of the present disclosure. As shown in FIG. 7, in the example shown in FIG. 7, it is preset that information used to eliminate a threat in a host is a second type of information "a cleanup program".

Step 701: A network security protection device obtains network environment data and threat detection data of a Host1 in an active manner or a passive manner.

Optionally, if a processing capability of the network security protection device is limited, or there is a large quantity of devices in a protected network, an identifier of a protected host may be pre-input using a graphical user interface (GUI) of the network security protection device. The network security protection device may regularly obtain the network environment data and the threat detection data of the protected host according to the pre-stored identifier of the protected host and according to a preset detection period. The identifier of the protected host may be an Internet Protocol (IP) address of the host, a media access control (MAC) address of the host, a user name of a user of the host, or the like. A network security protection device runs an embedded vulnerability scanning tool to obtain the network environment data and the threat detection data of the Host1, or may obtain the network environment data of the Host1 by performing packet parsing on traffic that comes from the Host1 and flows through the network security protection device.

If a processing capability of the network security protection device is relatively strong, or there is a small quantity of devices in a protected network, the network security protection device may obtain, according to a preset detection period, network environment data and threat detection data of each host in a network address segment in which the protected network is located.

In actual application, a manner of obtaining network environment data and threat detection data may be flexibly set according to a specific network environment.

An identifier of an operating system, a version of the operating system, an identifier of software, and a version of the software that are in the network environment data of the Host1 are respectively Windows, Windows XP, QQ, and QQ4. A threat type and a vulnerability identifier in the threat detection data are respectively a vulnerability and CVE-2013-0098.

Step 702: The network security protection device queries a pre-stored record set shown in FIG. 4, and determines whether information that is about a cleanup program and that is corresponding to the network environment data of the Host1 exists. In this example, the network security protection device first searches the record set shown in FIG. 4; if the information that is about a cleanup program and that is corresponding to the network environment data of the Host1 exists in FIG. 4, step 703 is performed; or if the information that is about a cleanup program and that is corresponding to the network environment data of the Host1 does not exist in FIG. 4, step 710 is performed.

R4 in FIG. 4 is used as an example, where R4 indicates that an identifier of an operating system, a version of the operating system, a name of a corresponding cleanup program, and a storage location of the cleanup program that are in network environment data are respectively Windows, Windows XP, Win14, and/patch/win-2013-0098.msi. After comparison, the network security protection device determines that the network environment data in R4 is the same as the network environment data of the Host1, and obtains information about a cleanup program from R4, that is, an identifier of the cleanup program Win14 and a storage location /patch/win-2013-0098.msi of the cleanup program.

Step 703: The network security protection device obtains a cleanup program whose identifier is Win14 at a storage location/patch/win-2013-0098.msi according to the information that is about the cleanup program and that is obtained in step 702. Step 704 is performed.

Step 704: The network security protection device sends the cleanup program whose identifier is Win14 to the Host1. In this example, the network security protection device establishes a transmission control protocol (TCP) connection with the Host1 according to an IP address of the Host1, and sends, using the established TCP connection, the cleanup program whose name is Win14 to an agent program in the Host1. It should be noted that, the "agent program" in this embodiment of the present disclosure refers to a process generated after a processor executes program code.

Step 705: The Host1 runs the received cleanup program whose identifier is Win14. In this example, the agent program in the Host1 runs the cleanup program after receiving the cleanup program whose name is Win14.

Inter-process communication between the agent program and the cleanup program may be implemented based on a client-server socket mechanism, where the cleanup program is used as a client, and the agent program is used as a server. When creating a process of the cleanup program in a memory, the agent program allocates a bound port to the cleanup program. The cleanup program sends, to the agent program using the port, data representing a running end, and after the agent program receives the data representing a running end, the agent program determines that execution of the cleanup program is completed.

Step 710: The network security protection device queries a record set shown in FIG. 6, and determines whether information that is about a cleanup program and that is corresponding to the network environment data and the threat detection data of the Host1 exists. If the information that is about a cleanup program and that is corresponding to the network environment data and the threat detection data of the Host1 exists in FIG. 6, processing similar to step 703 to step 705 is performed, and the cleanup program is sent to the Host1.

If the information that is about a cleanup program and that is corresponding to the network environment data and the threat detection data of the Host1 does not exist in FIG. 6, return to step 701.

The record sets shown in FIG. 4 and FIG. 5 may be stored in a same database, so that query processing may be completed at one time.

Figure 8:
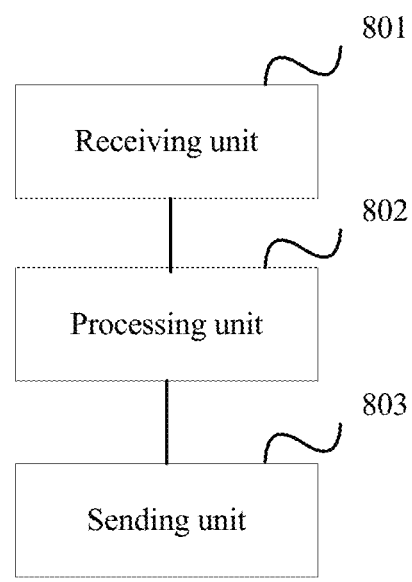
FIG. 8 is a schematic structural diagram of a network security protection apparatus according to an embodiment of the present disclosure.

An embodiment of the present disclosure further provides a network security protection apparatus. As shown in FIG. 8, the apparatus includes a receiving unit 801, a processing unit 802, and a sending unit 803, and details are as follows.

The receiving unit 801 is configured to obtain at least one of network environment data or threat detection data of a host that is in a protected network and that is connected to the network security protection apparatus, where the network environment data includes at least one of the following: an identifier of an operating system, a parameter of the operating system, an identifier of software with a network port access function, or a parameter of the software; and the threat detection data includes at least one of the following: a threat type or a threat identifier, where the threat type includes at least one of a vulnerability or a malicious program.

The processing unit 802 is configured to search, according to the at least one of network environment data or threat detection data obtained by the receiving unit 801, for corresponding information used to eliminate a security threat in the host.

The sending unit 803 is configured to provide the host with the information that is used to eliminate the security threat in the host and that is found by the processing unit 802.

Optionally, the information used to eliminate the security threat in the host includes at least one of the three types of information mentioned in the foregoing method embodiments.

If the information used to eliminate the security threat in the host is a cleanup program, the processing unit 802 is configured to search for an identifier and a storage location of a corresponding cleanup program, and obtain, according to the found identifier and storage location, the cleanup program used to eliminate the security threat in the host.

The sending unit 803 sends the cleanup program obtained by the processing unit 802 to the host.

The foregoing network security protection apparatus may be integrated, as a software or hardware module, into a gateway, a firewall, or a NAT device that connects the protected network to the Internet, or may be deployed on an independent device at another location in the protected network. The network security protection apparatus is applied to scenarios shown in FIG. 1A, FIG. 1B and FIG. 1C in the method embodiment 1, and implements a function of a network security protection device in the method embodiment 1. For another additional function that may be implemented by the network security protection apparatus and a process of interaction between the network security protection apparatus and another network element device, refer to a description of the network security protection device in the method embodiment, and details are not described herein again.

This embodiment of the present disclosure provides a network security protection apparatus. The security protection apparatus obtains at least one of network environment data or threat detection data of a host that is in a protected network and that is connected to the security protection apparatus; searches, according to the obtained at least one of network environment data or threat detection data, for corresponding information used to eliminate a security threat in the host, such as a cleanup program; and provides the host with the information used to eliminate the security threat in the host. Therefore, the network security protection apparatus can not only find a threat that has occurred in the protected network, but also find a potential threat, and actively trigger the host to eliminate the security threat, thereby improving a network security protection effect.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as a "circuit", a "module", or a "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a ROM, an EPROM or flash memory, an optical fiber, or a CD-ROM.

A processor in a computer reads computer-readable program code stored in a computer-readable medium, so that the processor can perform a function and an action specified in each step or a combination of steps in a flowchart; and an apparatus is generated to implement a function and an action specified in each block or a combination of blocks in a block diagram.

Computer-readable program code may be completely executed on a local computer of a user, partially executed on a local computer of a user, executed as a standalone software package, partially executed on a local computer of a user and partially executed on a remote computer, or completely executed on a remote computer or a server. It should also be noted that, in some alternative implementation solutions, steps in a flowchart or functions specified in blocks in a block diagram may not occur in an illustrated order. For example, depending on an involved function, two consecutive steps or two consecutive blocks in the illustration may actually be executed substantially at the same time, or these blocks may sometimes be executed in reverse order.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A network security protection method executed by a network security protection device comprising a database, wherein the method comprises:
    obtaining network environment data or threat detection data of a host that is in a protected network and that is coupled to the network security protection device, wherein the network environment data comprises at least one of a type of an operating system, a version of the operating system, an identifier of software with a network port access function, or a version of the software, wherein the threat detection data comprises at least one of a threat type or a threat identifier, and wherein the threat type comprises a vulnerability;
    searching the database, according to a combination of the network environment data or the threat detection data, for information used to eliminate a security threat in the host, wherein the information used to eliminate the security threat in the host comprises a file operation instruction, wherein the file operation instruction comprises a file identifier, a file storage location, and an operator, and wherein the file operation instruction is used to instruct the host to perform an operation represented by the operator on a file that is in the host and that is determined according to the file identifier and a file storage location; and
    sending the information used to eliminate the security threat in the host to the host,
    wherein the database comprises a correspondence number, the file identifier, the file storage location, and the operator,
    wherein the database further comprises at least one of the type of the operating system, the version of the operating system, the identifier of the software, or the version of the software, and
    wherein the database further comprises the threat type or the threat identifier.

2. The network security protection method of claim 1, wherein the database comprises a relational database, and wherein the relational database associates the network environment data and the threat detection data with an identifier of a cleanup program and a storage location of the cleanup program.

3. The network security protection method of claim 1, wherein the threat identifier comprises a common vulnerabilities and exposures (CVE) number used by a vulnerability knowledge base.

4. The network security protection method of claim 1, wherein the threat identifier comprises a computer security mailing list number.

5. The network security protection method of claim 1, wherein the network security protection device obtains the network environment data in an active manner in which the network security protection device actively runs vulnerability scanning software.

6. The network security protection method of claim 1, wherein the network security protection device obtains the network environment data in a passive manner in which the network security protection device performs packet parsing on traffic flowing through the network security protection device.

7. The network security protection method of claim 1, wherein searching, according to the network environment data or the threat detection data, for the information used to eliminate the security threat in the host comprises simultaneously searching multiple databases for the information used to eliminate the security threat in the host.

8. The network security protection method of claim 1, wherein the operator comprises a delete (Del) operation, and wherein the file operation instruction is used to instruct the host to delete a file that is in the host and that is determined according to the identifier and the file storage location.

9. A network security protection device, comprising:
    a memory configured to store program code, a database, and data;
    a network interface configured to obtain network environment data or threat detection data of a host that is in a protected network and that is coupled to the network security protection device, wherein the network environment data comprises at least one of a type of an operating system, a version of the operating system, an identifier of software with a network port access function, or a version of the software, wherein the threat detection data comprises at least one of a threat type or a threat identifier, and wherein the threat type comprises a vulnerability; and
    a processor coupled to the memory and the network interface and configured to read the program code and the data that are stored in the memory to cause the network security protection device to be configured to:

search the database, according to a combination of the network environment data or the threat detection data obtained using the network interface, for information used to eliminate a security threat in the host, wherein the information used to eliminate the security threat in the host comprises a file operation instruction, wherein the file operation instruction comprises a file identifier, a file storage location, and an operator, and wherein the file operation instruction is used to instruct the host to perform an operation represented by the operator on a file that is in the host and that is determined according to the file identifier and the file storage location; and provide, using the network interface, the host with the information used to eliminate the security threat in the host, wherein the database comprises a correspondence number, the file identifier, the file storage location, and the operator, wherein the database further comprises at least one of the type of the operating system, the version of the operating system, the identifier of the software, or the version of the software, and wherein the database further comprises the threat type or the threat identifier.

10. The network security protection device of claim 9, wherein the database comprises a relational database, and wherein the relational database associates the network environment data and the threat detection data with an identifier of a cleanup program and a storage location of the cleanup program.

11. The network security protection device of claim 9, wherein the threat identifier comprises a common vulnerabilities and exposures (CVE) number used by a vulnerability knowledge base.

12. The network security protection device of claim 9, wherein the threat identifier comprises a computer security mailing list number.

13. The network security protection device of claim 9, wherein the network security protection device obtains the network environment data in an active manner in which the network security protection device actively runs vulnerability scanning software.

14. The network security protection device of claim 9, wherein the network security protection device obtains the network environment data in a passive manner in which the network security protection device performs packet parsing on traffic flowing through the network security protection device.

15. The network security protection device of claim 9, wherein the network security protection device is configured to search, according to the network environment data and the threat detection data, for the information used to eliminate the security threat in the host comprises simultaneously searching multiple databases for the information used to eliminate the security threat in the host.

16. The network security protection device of claim 9, wherein the operator comprises a delete (Del) operation, and wherein the file operation instruction is used to instruct the host to delete a file that is in the host and that is determined according to the identifier and the file storage location.

17. A computer program product comprising computer-executable instructions for storage on a non-transitory computer-readable medium that, when executed cause a network security protection device comprising a database to:

obtain network environment data or threat detection data of a host that is in a protected network and that is coupled to the network security protection device, wherein the network environment data comprises at least one of a type of an operating system, a version of the operating system, an identifier of software with a network port access function, or a version of the software, wherein the threat detection data comprises at least one of a threat type or a threat identifier, and wherein the threat type comprises a vulnerability;

search the database, according to a combination of the network environment data or the threat detection data, for information used to eliminate a security threat in the host, wherein the information used to eliminate the security threat in the host comprises a file operation instruction, wherein the file operation instruction comprises a file identifier, a file storage location, and an operator, and wherein the file operation instruction is used to instruct the host to perform an operation represented by the operator on a file that is in the host and that is determined according to the file identifier and a file storage location; and send the information used to eliminate the security threat in the host to the host, wherein the database comprises a correspondence number, the file identifier, the file storage location, and the operator, wherein the database further comprises at least one of the type of the operating system, the version of the operating system, the identifier of the software, or the version of the software, and wherein the database further comprises the threat type or the threat identifier.

* * * * *